May 20, 1969   K. HUFF ET AL   3,445,561
PROCESS FOR PRODUCING POLYCARBONATE FILMS AND PRODUCT THEREOF
Filed June 21, 1963
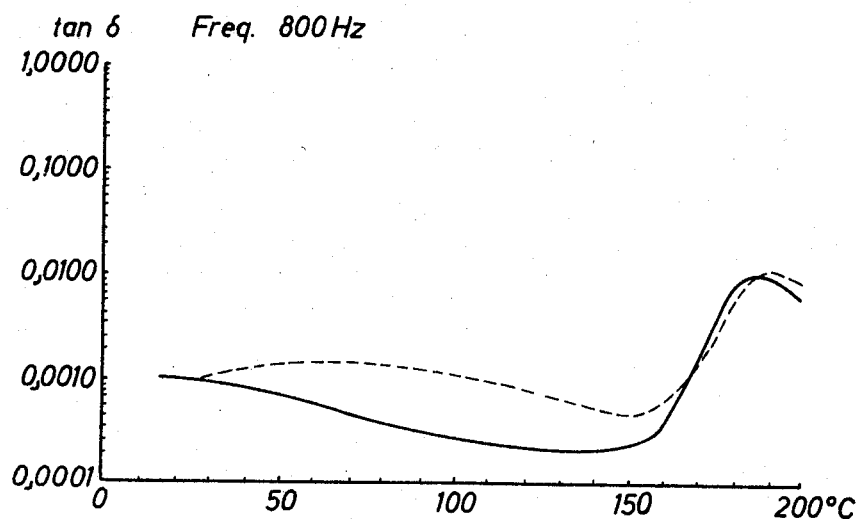
INVENTORS
HERMANN HOFMEIER, KARL HUFF
BY
ATTORNEYS

United States Patent Office 3,445,561
Patented May 20, 1969

3,445,561
PROCESS FOR PRODUCING POLYCARBONATE FILMS AND PRODUCT THEREOF
Karl Huff and Hermann Hofmeier, Dormagen, Germany, assignors to Farbenfabriken Bayer Aktiengesellschaft, Leverkusen, Germany, a German corporation
Filed June 21, 1963, Ser. No. 289,697
Claims priority, application Germany, June 25, 1962, F 37,150
Int. Cl. D01d 5/00; B29c 25/00
U.S. Cl. 264—288                    13 Claims This invention relates to polycarbonate compositions and more specifically to improved shaped elements produced from polycarbonate resins.

It is known to produce polycarbonate materials, for example, by the process described in U.S. Patents 3,028,365; 3,043,800 and 3,043,802. Probably the most commercially used process for the preparation of polycarbonate involves the phosgenation of 2,2-bis-(4-hydroxyphenyl)-propane (Bisphenol A) as is described in detail in the above-noted U.S. Patent 3,028,365.

It is also known to produce shaped elements from these polycarbonate materials, such as, for example, films, foils, filaments and strips. These films or foils produced are stretched during the manufacturing procedure to approximately the desired thickness. The procedures of stretching the films or foils mono-axially have been proposed since they offer the advantage of ease of operation. Mono-axially stretching films of polycarbonate, however, have a disadvantage in that the edge tearing strength is low and the dielectric loss angle is relatively high. To avoid these inherent difficulties, processes have been developed wherein the polycarbonate film or foil is bi-axially stretched. While these procedures result in polycarbonate films or foils having comparatively high tearing strength, the processes are substantially more expensive and much more difficult to carry out on a commercial scale. Also in the bi-axially stretching procedures the resulting polycarbonate films or foils have relatively high dielectric loss angles. Dielectric loss angles and their significance are defined in ASTM—D 150–59T, 1961, vol. II. Pages 859 to 879.

The known processes, therefore, have inherent disadvantages in that (1) the mono-axially stretching procedures result in polycarbonate films or foils of inferior quality and (2) the bi-axially stretching procedures are quite costly, relatively complex and substantially difficult to carry out on a large commercial scale.

It is, therefore, an object of this invention to provide a method of making polycarbonate shaped elements devoid of the above-noted disadvantages. Another object of this invention is to provide an improved process for the production of polycarbonate films or foils whereby the procedure involved is relatively simple and inexpensive. Another object of this invention is to provide a process for the production of polycarbonate films or foils whereby the resulting products have improved edge tearing strength. Still another object of this invention is to provide a process for the production of polycarbonate films or foils having improved breaking elongation. Yet another object of this invention is to provide the production of polycarbonate films and foils whereby the dielectric loss angle of the resulting polycarbonate products are substantially lowered. Another object of this invention is to provide a simple mono-axially stretching process for the production of polycarbonate films or foils having improved physical properties. Still another further object of this invention is to provide a method for the production of polycarbonate films or foils which are useful in the manufacture of high quality films.

The foregoing objects and others which will become apparent from the following description are accomplished, generally speaking, by providing a process for the production of polycarbonate films or foils having improved physical properties which comprises forming a polycarbonate film, longitudinally stretching said film and subsequently shrinking said film in its longitudinal direction in an amount of at least about 3% of its previous length. By "previous length" is meant the length of the polycarbonate film after the stretching operation has been completed. The present process involves a pre-shrinking step of longitudinally stretching the polycarbonate film or foil so as to have an increased length of about from 2 to 8 times its original unstretched length. After the second step shrinking operation is completed, the polycarbonate film or foil provided has an improved tearing strength, improved breaking elongation and lower dielectric loss angle. It is found that optimum results are obtained when using a preferred process where the films or foils are in a first step stretched to a length of about 3 to 6 times the original length and in a second step of shrinking the foil or film from about 10 to about 30% of the stretched or previous length. Polycarbonate films or foils having a thickness of about 0.003 to 1.0 mm. and having a crystallinity of at least about 10% also give improved results when used. While a crystallinity of from about 30 to 40% is preferred, any suitable film may be used. The second shrinking step in the present process involves the shrinking of the polycarbonate film by at least one of the following steps: (1) heating the film or foil to a temperature between about 10° C. below the melting point and 20° C. above the congealing temperature of the polycarbonate used; shrinking temperature of about 150 to 210° C. is preferred using inert gases or liquid or even irradiation as the heating medium; (2) by treating the polycarbonate film or foil with a swelling agent; (3) by treating the polycarbonate film or foil with a polycarbonate solvent. It is preferred to use the conventional Bisphenol A polycarbonate (as described in U.S. Patent 3,028,365) in the process herein defined.

The polycarbonate shaped elements described in the present process relate to polycarbonate films, foils filaments and strips; however, for purpose of convenience, these polycarbonate shaped elements will be referred to throughout the disclosure and claims as polycarbonate films.

To carry out the heat treatment, the foils, for example, in freely suspended form can be heated to relatively high temperatures until the required degree of shrinkage is obtained. The treatment can be carried out continuously. For this purpose, the webs of foil are run from a pair of supply rollers through a heating zone to a pair of withdrawal rollers. However, care should be taken that the foil is not subjected between the two pairs of rollers to any tension which completely or partially prevents shrinkage. At the prescribed temperature of the foil in the heating zone, the ratio between the speeds of the pair of supply rollers and the pair of withdrawal rollers is so adjusted that the foil no longer sags.

Any polycarbonate solvent may be used in the shrinking operation. Typical solvents are methylene chloride, tetrachloroethane, ethylene dichloride, chloroform, trichloroethane, thiophene, dioxane, tetrahydrofuran, monochlorobenzene, dichlorobenzene and mixtures thereof.

In lieu of the heat treatment above-defined or the use of a solvent above-defined in the shrinking step, swelling agents may be used. Typical polycarbonate swelling agents include acetone, benzene, toluylene, aromatic hydrocarbons, ethers such as dibutyl ether, esters, ketones, glycols such as methyl glycol chloroform and mixtures thereof.

If solvents are used, these must, of course, only be allowed to be operative for extremely short times. Swelling agents or mixtures of swelling agents and solvents are, therefore, more suitable. The treatment can be carried out in various ways. Thus, the foils can be placed in liquid or they can be drawn through liquid baths. However, it is also possible for the swelling agents and solvents to act in vapor form on the foils. For example, a foil can be drawn through a chamber filled with a suitable vapor. In this case, it may also be possible for the temperature to be raised.

The duration of the action is very important both in the treatment by heat and in the treatment with swelling agents. It must last at least sufficiently long for the foil to shrink by about 3%. The best results are obtained if the treatment is so chosen that the foil shrinks by about 10 to about 30% in the stretching direction.

By "free from tension," as used herein, there is to be understood that the foils can shrink in an uninhibited manner. If the foils hang freely, they are undoubtedly subjected to a tension which is caused by their own weight. Nevertheless, they can shrink freely. In the same way, slight tensions are also produced when drawing the foils through solvent baths. Here also, it is only important that they can shrink in an uninhibited manner. The tension which may be present must, therefore in every case, be substantially smaller than the shrinkage force developed in the treatment.

As compared with the untreated foils used as starting materials, the foils obtained according to the invention have the following properties: the tensile strength is about the same, the edge tearing strength is substantially increased, for example, to about three times, the breaking elongation is improved, for example, by about three times and the dielectric loss angle is substantially lower. At a prescribed temperature, it may have been reduced by the treatment to about 1/10 of the original value.

The polycarbonate foils obtained according to the invention are excellently suitable as condenser foils and electric insulation foils because of their dielectric behavior. In addition, they have the necessary high edge tearing strength, although they are only stretched in one direction.

The following examples are given for the purpose of illustration, parts being by weight unless otherwise specified.

Example 1

A partially crystalline foil with a thickness of 0.06 mm. and stretched in the ratio 1:4 is heated for 2 hours without tension at 175° C. The foil consists of the polycarbonate of 2,2'-di-(4-hydroxyphenyl)-propane. The heating takes place in the presence of air. A foil with improved dielectric properties is obtained. The dependence of the dielectric loss angle on the temperature at a frequency of 800 c./s. is shown in FIG. 1, in broken lines for the untreated foil and in full lines for the foil treated according to the invention. As can be seen from this figure, the dielectric loss angle of the treated foil is almost 1/10 of the value of the untreated foil in the important temperature range between 50 and 150° C.

Example 2

Partly crystalline polycarbonate foils (polycarbonate of 2,2'-di-(4-hydroxy phenyl)-propane) stretched in one direction (1:4) are heat-treated for about 30 minutes while hanging freely in a drying chamber, the foils shrinking to a greater or lesser degree in the stretching direction, depending on the temperature. Thereafter, the thickness, tensile strength and tearing strength are measured at room temperature. The values obtained are shown in Table 1:

TABLE 1

| Temp., °C. | Longitudinal shrinkage, percent | Thickness, mm. | Tensile strength, kg./mm.$^2$ | Breaking elongation, percent | Tearing strength, kg. | Tearing elongation, percent |
|---|---|---|---|---|---|---|
| Untreated | | 0.018 | 25.0 | 15.6 | 3.8 | 3.7 |
| 140 | 5.3 | 0.019 | 24.7 | 23.5 | 7.5 | 10.3 |
| 160 | 10.8 | 0.020 | 24.8 | 40.5 | 12.1 | 22.7 |
| 180 | 18.0 | 0.022 | 24.4 | 47.5 | 12.3 | 23.1 |

Example 3

A partially crystalline foil consisting of 2,2'-di-(4-hydroxy phenyl)-propane polycarbonate, stretched in one direction in the ratio of 1:4, is withdrawn from a pair of supply rollers and through a heating zone by means of a pair of withdrawal rollers. The heating zone consists of an infra-red radiator, which is arranged above and below the zone. Different foil temperatures in the range from about 140 to 190° C. are set. For the individual temperatures, the shrinkage ratios are adjusted by varying the speed of the pair of supply rollers, on the one hand, and of the pair of withdrawal rollers on the other hand. Care is taken in this connection that the foil no longer sags. The properties of the foils obtained are set out in Table 2. The first line of this table relates to untreated material.

TABLE 2

| Longitudinal Shrinkage | Thickness, mm. | Tensile strength, kg./mm.$^2$ | Breaking elongation, percent | Tearing strength, kg. | Tearing elongation, percent |
|---|---|---|---|---|---|
| 0 | 0.018 | 25.0 | 15.6 | 3.8 | 3.7 |
| 5 | 0.019 | 24.8 | 23.1 | 7.3 | 9.8 |
| 10 | 0.020 | 24.7 | 39.1 | 11.9 | 21.5 |
| 15 | 0.021 | 24.4 | 42.7 | 12.1 | 22.9 |

Example 4

Partially crystalline polycarbonate foils (polycarbonate of 2,2'-di-(4-hydroxy phenyl)-propane) stretched in one direction in the ratio of 1:4 are laid in acetone at room temperature. They thereby swell and shrink longitudinally. Thereafter, the foils are dried until the weight is constant. The measured values of the tearing strength, depending on the shrinkage which is a function of the time during which the foil was in acetone are set out in Table 3.

TABLE 3

| Frit thickness, mm. | Longitudinal shrinkage, percent | Swelling time, min. | Tearing strength, kg. |
|---|---|---|---|
| 0.056 | 0 | 0 | 13.8 |
| 0.056 | 4.3 | 1 | 18.5 |
| 0.057 | 7.8 | 2 | 19.2 |
| 0.058 | 12.5 | 3 | 23.0 |
| 0.060 | 13.7 | 4 | 23.0 |
| 0.060 | 15.6 | 5 | 24.0 |

Example 5

A partially crystalline foil from the polycarbonate of 2,2'-di-(4-hydroxy phenyl)-propane stretched in one direction in the ratio of 1:4 is exposed to an atmosphere saturated with vapors of methylene chloride at room temperature. Thereafter, the foil is dried at 100° C. until its weight is constant. The measured values of the tearing strength which depend on the shrinkage which is a function of the time during which the foil was exposed to the methylene chloride vapors, are listed in Table 4.

TABLE 4

| Thickness mm. | Swelling time, min. | Longitudinal shrinkage, percent | Tearing strength, kg |
|---|---|---|---|
| 0.019 | 0 | 0 | 4.1 |
| 0.021 | 1 | 10.5 | 9.2 |
| 0.022 | 2 | 15.8 | 12.2 |
| 0.023 | 3 | 18.2 | 12.5 |

It is to be understood that this invention is not limited by the examples, but that any of the compositions mentioned above as typical for use in the present invention may be used in place of those set forth in the examples with similar results.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A process for the production of polycarbonate films having improved physical properties which comprises forming a polycarbonate film having a crystallinity of at least about 10%, longitudinally stretching said film to from about 2 to about 8 times its original length and subsequently shrinking said film while substantially free of tension in its longitudinal direction in an amount at least about 3% of its stretched length.

2. The process of claim 1 wherein said shrinking step is effected by heating said film to a temperature of from about 20° C. above the congealing temperature of the polycarbonate used to about 10° C. below the melting point of the polycarbonate used.

3. The process of claim 1 wherein said snrinking step is effected by contacting said polycarbonate film with a solvent for said film.

4. The process of claim 1 wherein said shrinking operation is effected by contacting said polycarbonate film with a swelling agent for said film.

5. The process of claim 1 wherein said shrinking operation is effected by contacting said polycarbonate film with a mixture of a swelling agent and solvent for said film.

6. The process of claim 1 wherein said polycarbonate film comprises a polycarbonate prepared from 2,2-bis-(4-hydroxy phenyl)-propane.

7. A process for the production of a polycarbonate film having improved pnysical properties which comprises forming a polycarbonate film having a crystallinity of at least about 10%, stretching said film in its longitudinal direction to an amount of from about 2 to 8 times its original length, and subsequently shrinking said polycarbonate film while substantially free of tension in the same longitudinal direction in an amount of from about 10 to 30% of its stretched length.

8. The process of claim 7 wherein said shrinking operation is effected by contacting said polycarbonate film with a polycarbonate solvent.

9. The process of claim 7 wherein said shrinking operation is effected by contacting said polycarbonate film with a swelling agent.

10. The process of claim 7 wherein said shrinking operation is effected by contacting with a mixture of a polycarbonate solvent and a polycarbonate swelling agent.

11. The process of claim 7 wherein said shrinking operation is effected by heating said film to a temperature of from about 150° C. to about 210° C.

12. A process for the production of a polycarbonate film having improved physical properties which comprises forming a polycarbonate film from a polycarbonate of 2,2-bis(4-hydroxy phenyl)-propane, stretching said film to at least about two times its original length, shrinking said film while substantially free of tension in its longitudinal direction in an amount of from about 10 to 30% of its stretched length, said shrinking step effected by heating said film to a temperature of about 150 to 210° C.

13. The film produced by the process of claim 1 wherein said film has improved tearing properties.

References Cited

UNITED STATES PATENTS

| | | | |
|---|---|---|---|
| 2,974,370 | 3/1961 | Baird | 264—230 |
| 2,979,774 | 4/1961 | Rusignolo | 264—288 |
| 3,073,002 | 1/1963 | Munt | 264—335 |
| 3,083,071 | 3/1963 | Wishman | 264—342 |
| 3,214,500 | 10/1965 | Maervo | 264—210 |

FOREIGN PATENTS

| | | |
|---|---|---|
| 221,934 | 10/1957 | Australia. |
| 622,443 | 6/1961 | Canada. |

OTHER REFERENCES

Heimans, P.H., Physics and Chemistry of Cellulose Fibres, Elseuier Pub. Co. Inc., New York, N.Y. (1949).

DONALD J. ARNOLD, *Primary Examiner.*

U.S. Cl. X.R.

260—47; 264—210, 211, 234, 342, 345